US009323866B1

(12) United States Patent
Duddu et al.

(10) Patent No.: US 9,323,866 B1
(45) Date of Patent: *Apr. 26, 2016

(54) QUERY COMPLETIONS IN THE CONTEXT OF A PRESENTED DOCUMENT

(71) Applicant: Google Inc., Mountain View, CA (US)

(72) Inventors: Sarveshwar Duddu, Bangalore (IN); Lev Finkelstein, Haifa (IL)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/849,349

(22) Filed: Sep. 9, 2015

Related U.S. Application Data

(63) Continuation of application No. 13/774,640, filed on Feb. 22, 2013, now Pat. No. 9,135,250.

(60) Provisional application No. 61/603,139, filed on Feb. 24, 2012.

(51) Int. Cl.
*G06F 17/30* (2006.01)
(52) U.S. Cl.
CPC ...... *G06F 17/3097* (2013.01); *G06F 17/30011* (2013.01); *G06F 17/3053* (2013.01); *G06F 17/30864* (2013.01); *G06F 17/30477* (2013.01)
(58) Field of Classification Search
CPC .......... G06F 17/3053; G06F 17/30011; G06F 17/30477; G06F 17/30864
USPC ....................................................... 707/728
See application file for complete search history.

(56) References Cited

U.S. PATENT DOCUMENTS

| | | |
|---|---|---|
| 5,845,300 A | 12/1998 | Comer et al. |
| 6,377,965 B1 | 4/2002 | Hachamovitch et al. |
| 6,564,213 B1 | 5/2003 | Ortega et al. |
| 7,349,899 B2 | 3/2008 | Namba |
| 7,487,145 B1 | 2/2009 | Gibbs et al. |
| 7,499,940 B1 | 3/2009 | Gibbs |
| 7,630,978 B2 | 12/2009 | Li et al. |
| 7,644,072 B2 | 1/2010 | Budzik et al. |
| 7,739,264 B2 | 6/2010 | Jones et al. |
| 7,756,855 B2 | 7/2010 | Ismalon |
| 7,836,044 B2 | 11/2010 | Kamvar et al. |
| 7,849,104 B2 | 12/2010 | Sun et al. |
| 7,917,490 B2 | 3/2011 | Norris et al. |
| 7,958,136 B1 | 6/2011 | Curtis et al. |
| 8,086,619 B2 | 12/2011 | Haahr et al. |

(Continued)

FOREIGN PATENT DOCUMENTS

WO     2006055120     7/2006

*Primary Examiner* — Rehana Perveen
*Assistant Examiner* — Tiffany Thuy Bui
(74) *Attorney, Agent, or Firm* — Middleton Reutlinger

(57) ABSTRACT

Methods, systems and apparatus are described herein that include receiving a partial query entered into a search field on a computing device, and data indicating a document presented on the computing device during entry of the partial query. Search results are then obtained which identify respective lists of search results documents for corresponding candidate query completions in a set obtained for the partial query. Similarity scores are then calculated for candidate query completions based at least in part on a similarity between content in the displayed document and content in search result documents in the corresponding lists. One or more candidate query completions in the set are then selected as refined query completions for the partial query based at least in part on the similarity scores and provided for presentation by the computing device.

20 Claims, 5 Drawing Sheets

(56) References Cited

U.S. PATENT DOCUMENTS

| | | |
|---|---|---|
| 8,135,728 B2 | 3/2012 | Yih et al. |
| 8,543,907 B1 | 9/2013 | Roskind |
| 8,572,481 B2 | 10/2013 | Migos et al. |
| 8,972,399 B2 | 3/2015 | Finkelstein et al. |
| 8,972,435 B2 | 3/2015 | De Barros et al. |
| 9,098,568 B2 | 8/2015 | Li et al. |
| 2006/0106769 A1 | 5/2006 | Gibbs |
| 2008/0091537 A1 | 4/2008 | Miller et al. |
| 2009/0198677 A1 | 8/2009 | Sheehy et al. |
| 2010/0318538 A1 | 12/2010 | Wyman et al. |
| 2011/0093488 A1 | 4/2011 | Amacker et al. |
| 2011/0258227 A1 | 10/2011 | Lacasse |
| 2012/0084310 A1 | 4/2012 | Lieb |
| 2012/0109884 A1 | 5/2012 | Goldentouch |

QUERY COMPLETIONS IN THE CONTEXT OF A PRESENTED DOCUMENT

BACKGROUND

The present disclosure relates to information retrieval.

Information retrieval systems, such as Internet search engines, help users by retrieving information, such as web pages, images, text documents and multimedia content, in response to queries. The search engine may use a variety of signals to determine the relevance of the retrieved content to the user's query.

Formulating a query that accurately represents the user's informational need can be challenging. For example, users may use query terms which are too general or ambiguous to yield high quality search results. That is, the search engine may return a number of resources which match the user's query, but which are unrelated to the informational need of the user. In such a case, the user may have to enter a number of different queries about the same topic before reaching resources that are of interest to the user.

Search engines may suggest queries to the user, to help the user. Some search engines provide query completions to the user as the user is typing a query.

SUMMARY

In one implementation, a method is described including receiving a partial query entered into a search field on a computing device. Data is also received indicating a document presented on the computing device during entry of the partial query. The method also includes obtaining a set of candidate query completions for the partial query. The method further includes identifying lists of search result documents for respective candidate query completions in the set. Similarity scores are then calculated for candidate query completions in the set. A similarity score for a given candidate query completion of the set of candidate query completions is based at least in part on a similarity between content in the displayed document and content in search result documents in the corresponding list. One or more of the candidate query completions in the set are then selected as refined query completions for the partial query based at least in part on the similarity scores. The refined query completions are then provided for presentation by the computing device.

This method and other implementations of the technology disclosed can each optionally include one or more of the following features.

Obtaining the search results can include obtaining search quality scores for search result documents in the respective lists. Selecting the one or more of the candidate query completions can be further based on the search quality scores for the search result documents in the respective lists.

The method can further include sorting the set of candidate query completions using the similarity scores to create a ranking. Selecting the one or more of the candidate query completions in the set as the refined query completions can be based at least in part on the ranking Selecting one or more of the candidate query completions can include selecting a predetermined number of highest ranked of the candidate query completions as the refined query completions.

Obtaining the set of candidate query completions can include obtaining initial ranking scores for the candidate query completions in the set. Selecting one or more of the candidate query completions as the refined query completions can be further based on the initial ranking scores.

The presented document can be presented within an application containing the search field.

The received data can include a unique document identifier for the presented document.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Particular implementations of the subject matter described herein enhance a user's search experience by providing refined query completions that are relevant to a user's own, currently presented document. These query completions are refined because they are selected based on a partial query being entered by the user, as well as the similarity between content in the user's own document and content in search results for the query completions. These refined query completions represent queries relevant to the user's currently displayed document, which the user may want to submit instead of the partial query actually being entered. As a result, contextually relevant query completions can be provided which can assist users in efficiently finding the information they seek.

Particular aspects of one or more implementations of the subject matter described in this specification are set forth in the drawings and the description below. Other features, aspects, and advantages of the subject matter will become apparent from the description, the drawings, and the claims.

DETAILED DESCRIPTION

Technology described herein enhances a user's search experience by providing refined query completions that are relevant to the user's own, currently presented document. The presented document may for example be a word processing document, a spreadsheet document, or a presentation document that has been created or otherwise edited by the user.

These query completions are refined because they are selected based on a partial query being entered by the user, as well as the similarity between content in the user's own document and content in search results for the query completions. These refined query completions thus represent queries relevant to the user's currently presented document, which the user may want to submit instead of the partial query actually being entered. As a result, contextually relevant query completions can be provided which can assist users in efficiently finding the information they seek.

Figure 1:
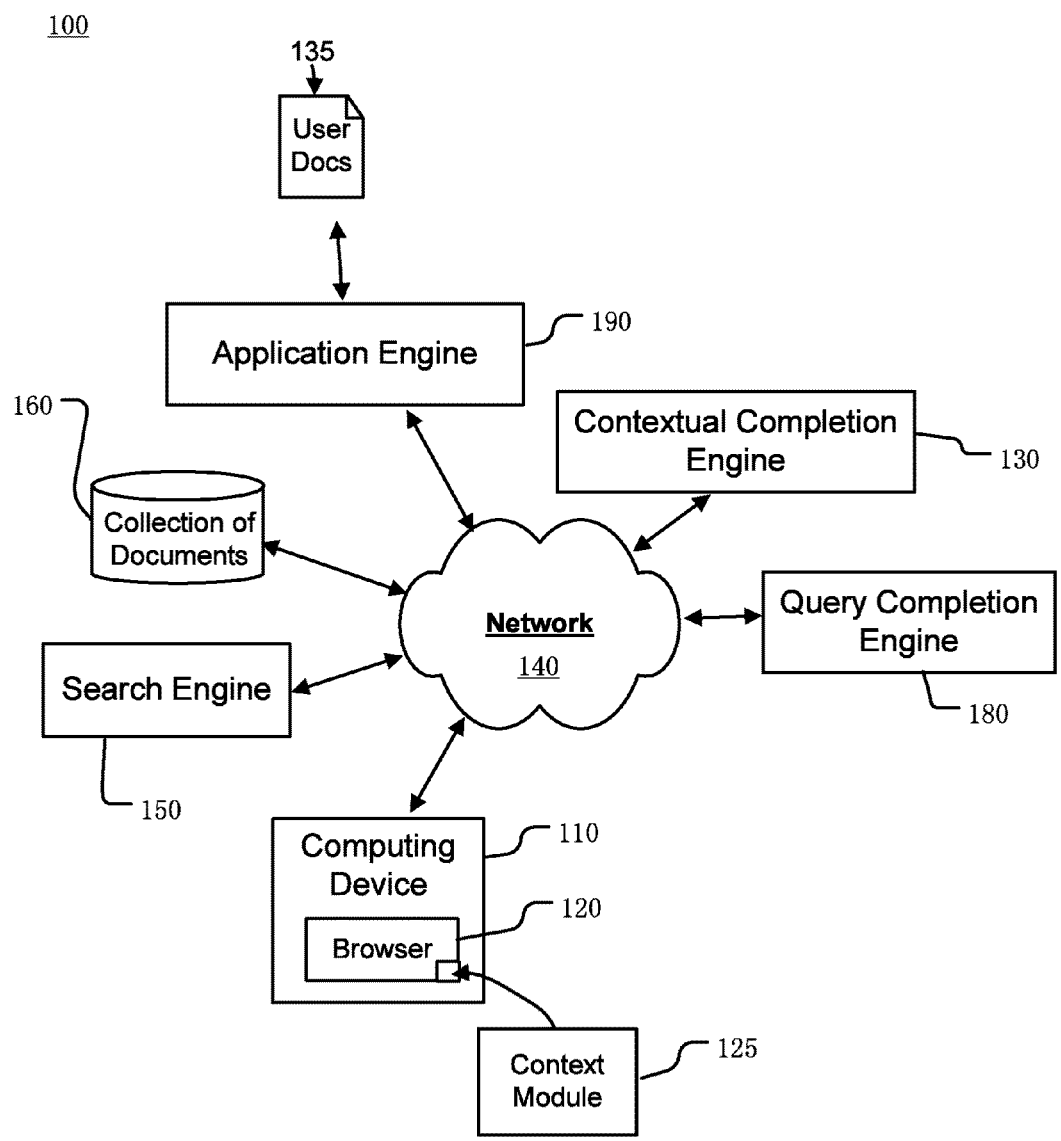
FIG. 1 illustrates a block diagram of an example environment for providing refined query completions that are relevant to a user's currently displayed document.

FIG. 1 illustrates a block diagram of an example environment 100 for providing refined query completions that are relevant to a user's currently displayed document. The environment includes a communication network 140 that facilitates communication between various components of the environment 100. In one implementation, the network 140 includes the Internet. The network 140 can also utilize dedicated or private communication links that are not necessarily part of the Internet. In one implementation, the network 140 uses standard communications technologies, protocols, and/or inter-process communication techniques.

The environment 100 also includes a computing device 110. The computing device 110 includes memory for storage of data and software applications, a processor for accessing data and executing applications, and components that facilitate communication over the communication network 140.

The computing device 110 executes an application, such as web browser 120, which allows a user to interact with an application engine 190. The application engine 190 is tasked with providing one or more applications, such as a word processing or spreadsheet applications, executed in the web browser 120. These applications may for example be implemented in JavaScript or other suitable programming language.

The applications provided by the application engine 190 allow the user of the computing device 110 to interact with the user's own user documents 135. The user documents 135 in this example are stored remotely by the application engine 190 and provided to the user over the network 140. Alternatively, the user documents 135 may be stored locally on the computing device 110. In such a case, the applications provided by the application engine 190 may be stored locally and executed by the computing device 110.

The user documents 135 may for example include word processing documents, spreadsheet documents, and/or presentation documents that have been created or otherwise edited by the user of the computing device. The user may for example edit the user documents 135 by adding, deleting and/or formatting characters.

The computing device 110 also executes a context module 125 that operates in conjunction with a contextual completion engine 130 (described below). The client side functionality of the context module 125 can be implemented as a web browser add-on, e.g. a plug-in or an extension to the browser 120. The context module 125 may alternatively be implemented as a toolbar running in the browser 120. As another example, the functionality of the context module 125 can integrated into the browser 120, the applications provided by the application engine 190, or other software executing on the computing device 110.

The context module 125 in this example provides a search field in a user interface. Alternatively, the search field may be provided within the user interface of another application, such as the web browser 120, executing on the client computing device 110. The search field allows the user to enter a query and submit it to a search engine 150. The user may submit the search query by selecting a search button displayed in the user interface adjacent to the search field. As another example, the user may submit the search query by entering a carriage return or equivalent character. As another example, the user may submit the search query by saying a command in a speech interface or pausing for more than a predetermined period of time.

The search engine 150 receives the query from the computing device 110, and executes the query against a collection of documents 160 of available resources such as web pages, images, text documents and multimedia content. The collection of documents 160 may be collectively stored on multiple computers and/or storage devices. The documents in the collection of documents 160 may be associated with unique document identifiers. A unique document identifier may be a Uniform Resource Locator (URL) of the associated document.

A document in the collection of documents 160 may be a web page, a word processing document, a portable document format (PDF) document, or any other type of electronic document. A document includes content such as words, phrases, images and videos. The content in the document can also include embedded information such as metadata and hyperlinks, and embedded instructions such as JavaScript scripts. As used herein, content refers generally to the electronic data in a particular document.

The search engine 150 identifies content which matches the query, and responds by generating search results which are transmitted to the client computing device 110 in a form that can be presented to the user. For example, in response to a query from the computing device 110, the search engine 150 may transmit a search results web page to be displayed in the web browser 120.

The context module 125 on the computing device 110 also transmits partial queries being entered into the search field to the contextual completion engine 130. A partial query is a query formulated by the user prior to an explicit request from the user to submit the query to the search engine 150. In some implementations, the context module 125 transmits each character of a query as it is being typed or otherwise entered by the user into the search field. In other implementations, multiple characters at a time may be provided following a pause between entries of characters by the user, or once a predetermined number of characters have been entered.

The context module 130 also transmits data to the contextual completion engine 130 indicating which document of the user documents 135 is currently presented within the web browser 120. In the following discussion, the context module 125 transmits data indicating a single document that is currently presented within the web browser 120. In other implementations, the transmitted data may indicate multiple documents of the user documents 135 that are currently presented in different tabs within the web browser 120. In yet other implementations, the transmitted data may indicate one or more documents of the user documents 135 presented in one or more different applications executing on the computing device 110.

The transmitted data may be a unique identifier of the presented document. Such a unique identifier may be assigned to each of the user documents 135 by the application engine 190. Alternatively, other data that can be used to uniquely identify the presented document may be transmitted. For example, the transmitted data may be data that has been extracted from the presented document for use in determining content within the presented document. This data may be certain human readable text within the presented document, such as the title, or embedded information such as metadata.

The contextual completion engine 130 receives the user's partial query and the data indicating the document presented in the browser 120. The contextual completion engine 130 may be implemented in hardware, firmware, or software running on hardware.

The contextual completion engine 130 forwards the user's partial query to a query completion engine 180. The query completion engine 180 includes memory for storage of data and software applications, a processor for accessing data and executing applications, and components that facilitate communication over the communication network 140.

In response to the partial query, the query completion engine 180 provides a set of candidate query completions for the partial query to the contextual completion engine 130. The query completion engine 180 may use conventional or other techniques to determine candidate query completions for the partial query. For example, the query completion engine 180 may use prefix based matching. The query completion engine 180 may also use other techniques to select the candidate query completions.

The query completion engine 180 may also provide initial ranking scores that were used to determine which candidate query completions for the partial query to include in the set. The initial ranking scores may for example be based on popularity. In one implementation, popularity is determined based on the frequency with which past users submitted the candidate query completions as complete queries to the search engine 150.

The contextual completion engine 130 then obtains respective search results for the corresponding candidate query completions in the set from the search engine 150. To obtain the search results, the contextual completion engine 130 first sends the candidate query completions in the set to search engine 150. The search engine 150 responds by transmitting search results to the contextual completion engine 130. The search results identify corresponding lists of search results documents in the collection of documents 160 that are responsive to the respective candidate query completions in the set. The search engine 150 can use conventional or other techniques to identify the search result documents that are responsive to a formulated query in the set.

In some implementations, the contextual completion engine 130 also obtains search quality scores for the search result documents in the corresponding lists. The search quality scores are assigned to the search result documents by the search engine 150 using a scoring function used to rank the search results. The search engine 150 can use conventional or other techniques to calculate the search quality scores.

The contextual completion engine 130 then calculates similarity scores for the suggested query completions in the set. The similarity score for a given suggested query completion in the set is based at least in part on the similarity between content in the displayed document, and content in search results documents in the corresponding list of search result documents. The techniques for calculating the similarity scores for the suggested query completions can vary from implementation to implementation.

In some implementations, for a given candidate query completion, individual similarity scores are first calculated for each search result document in the list of search result documents corresponding to the given candidate query completion. The individual similarity score for a search result document may be calculated by mapping the terms in the search result document onto a predefined set of N axes that represent different topics. Each term in the search result document may be represented as a vector in N-dimensional space, and the entire search result document may be represented as a document vector that is a sum of the corresponding term vectors. The individual similarity score can then be calculated as the cosine similarity between the search result document vector and a vector representing the mapping of the terms in the displayed document onto the set of axes. Alternatively, other or additional techniques may be used to calculate the individual similarity scores. For example, the individual similarity scores may be calculated using the Jensen-Shannon divergence of the vectors. In some implementations, the individual similarity score for a search result document may be further modified by its search quality score.

The final similarity score for the given candidate query completion can then be calculated as a function of the individual similarity scores for the search result documents in the corresponding list. This function may be for example a sum of the individual similarity scores, a product of the individual similarity scores, or the maximum of the individual similarity scores.

The contextual completion engine 130 then selects one or more of the candidate query completions as refined query completions for the partial query based at least in part on the final similarity scores. For example, a predetermined number of the candidate query completions having the highest final similarity scores may be selected. Alternatively, other criteria may be used. For example, the final similarity scores may be compared to a threshold, and the candidate query completions that satisfy the threshold may be selected.

In some implementations, the suggested query completions may for example be ranked by calculating refined ranking scores using the final similarity scores. The refined ranking score for a given suggested query completion may for example be a function of its initial ranking score and its final similarity score. This function may be for example a weighted average of its initial ranking score and its similarity score. The contextual completion engine 130 can then select one or more of the candidate query completions as refined query completions for the partial query based at least in part on their refined rankings The contextual completion engine 130 then provides the refined query completions for presentation by the computing device 110. These refined query completions represent queries relevant to the user's own presented document, which the user may want to submit instead of the partial query actually being typed. The refined query completions may for example be displayed within a cascaded menu above or below the search field as the user is typing.

Upon selection of a refined query completion by the user, the selected refined query completion can be provided to the search engine 150. In response, the search engine 150 may transmit search results for the selected refined query completion to the computing device 110 in a form that can be displayed to the user. For example, the search engine 150 may transmit a search results web page to be displayed in the web browser 120.

Many other configurations are possible having more or less components than the environment 100 shown in FIG. 1. For example, the environment 100 can include multiple search engines. The environment 100 can also include many more client computing devices that submit queries to search engines.

Figure 2:
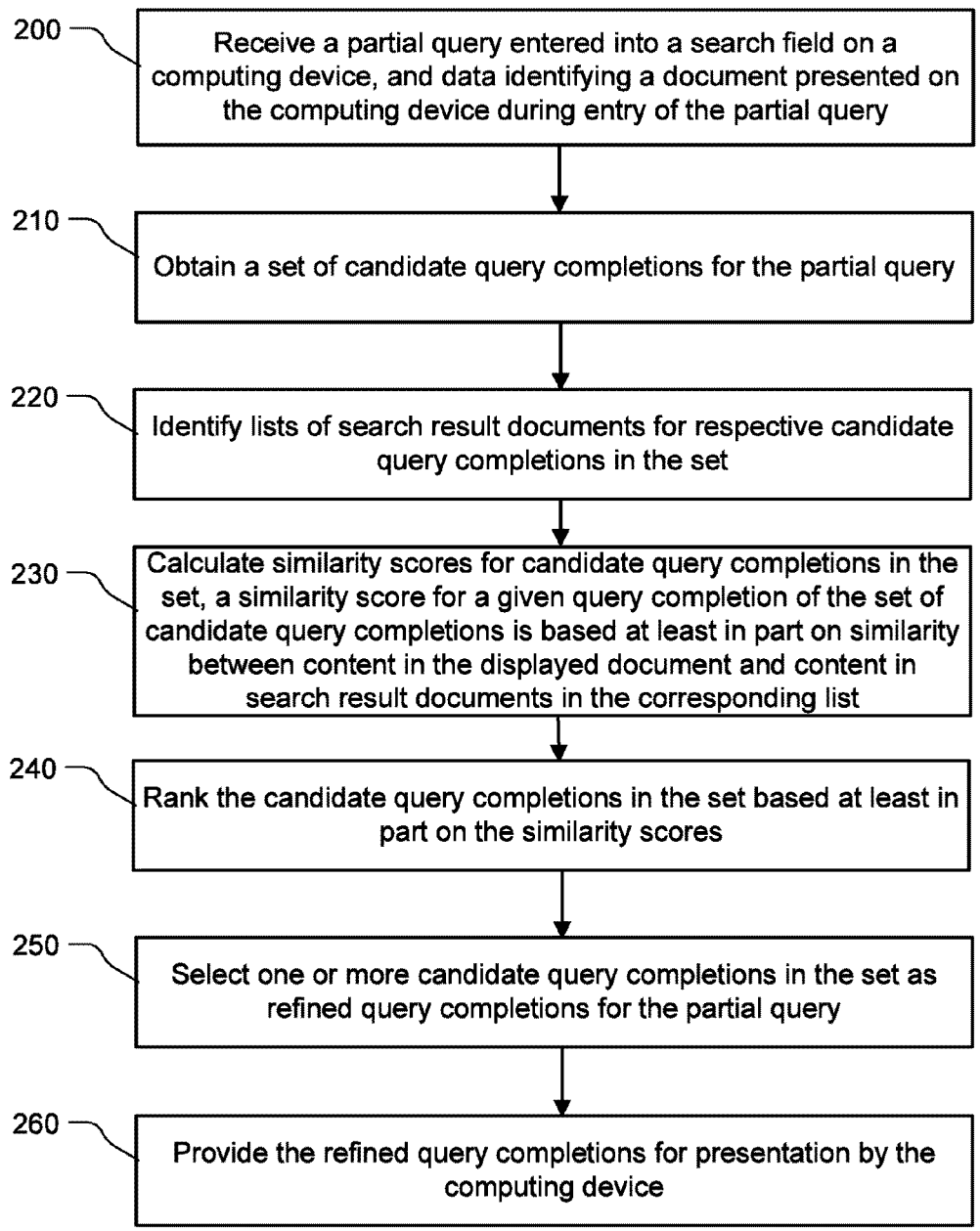
FIG. 2 is a flow chart illustrating an example process for providing refined query completions that are relevant to a user's currently displayed document.

FIG. 2 is a flow chart illustrating an example process for providing refined query completions that are relevant to a user's currently presented document. Other embodiments may perform the steps in different orders and/or perform different or additional steps than the ones illustrated in FIG. 2. For convenience, FIG. 2 will be described with reference to a system of one or more computers that performs the process. The system can be, for example, the contextual completion engine 130 described above with reference to FIG. 1.

At step 200, the system receives a partial query entered into a search field on a computing device. The system also receives data identifying a document presented on the computing device during entry of the partial query, where the displayed document has been edited by a user of the computing device.

At step 210, the system obtains a set of candidate query completions for the partial query. At step 220, the system obtains search results identifying corresponding lists of search result documents for respective candidate query completions in the set.

At step 230, the system calculates similarity scores for candidate query completions in the set. A similarity score for a given candidate query completion in the set is based at least in part on similarity between content in the displayed document, and content in search result documents in the corresponding list.

At step 250, the system selects one or more candidate query completions in the set as refined query completions for the partial query based at least in part on the similarity scores. At step 260, the system provides the selected one or more candidate query completions for presentation by the computing device.

Figure 3:
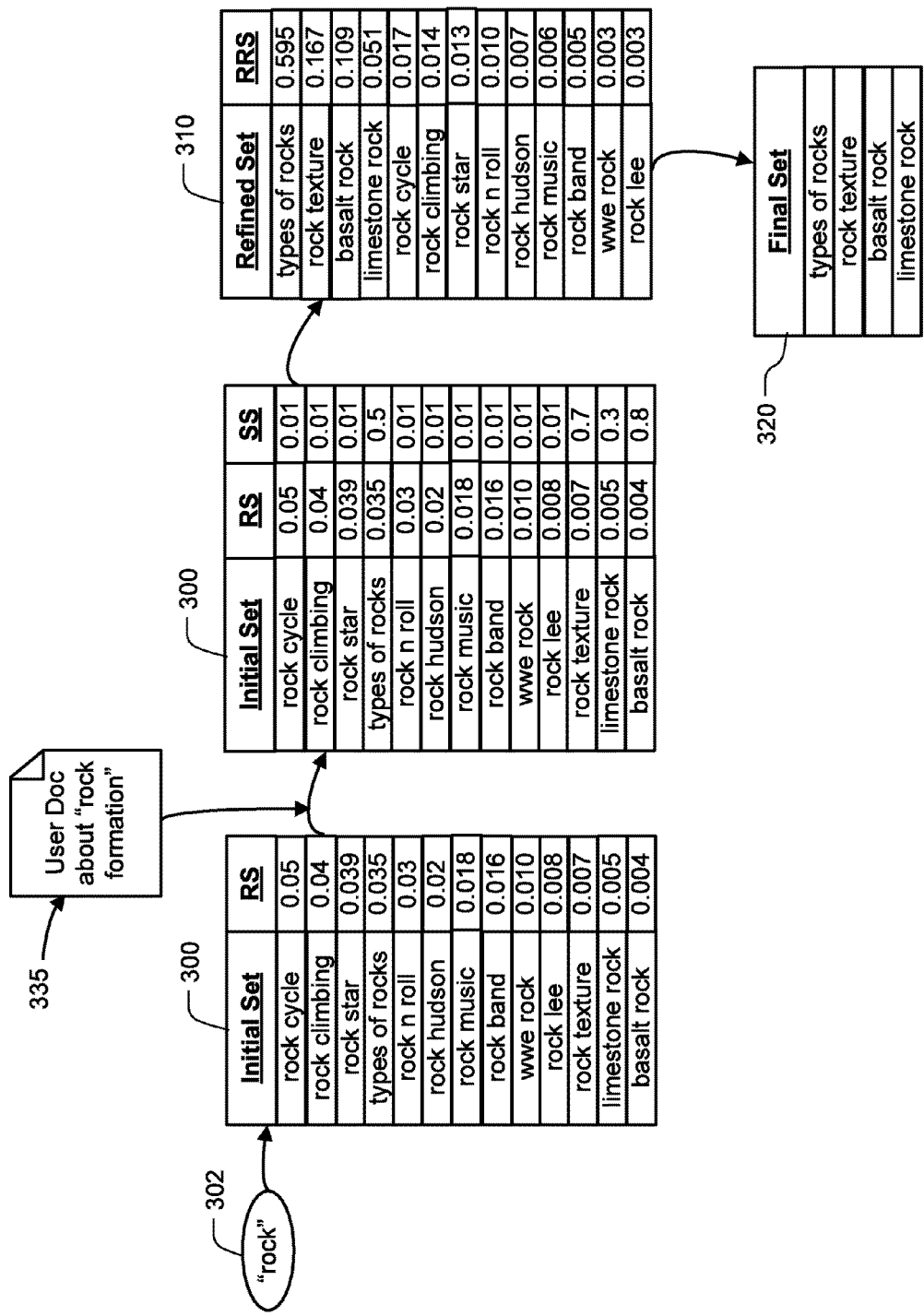
FIG. 3 illustrates an example of selecting refined query completions that are relevant to a user's document.

FIG. 3 illustrates an example of selecting refined query completions that are relevant to a user's document. In this example, the user enters the partial query "rock" 302 into a search field on a computing device while viewing the user's document 335 about "rock formation". In this example, the user's document 335 includes the following:

Igneous rocks can be categorized into Aphanite and Phaneritic depending on the granularity of the component minerals. Fine-grained igneous rocks whose crystals are not visible to the naked eye are called Aphanite Igneous rocks and the rest are called Phaneritic.

In response to the partial query 302, an initial set 300 of candidate query completions for the partial query 302 are obtained, along with their initial ranking scores (RS). The initial ranking scores (RS) in this example are based on the frequency with which past users submitted the candidate query completions as complete queries to a search engine.

Search results are then obtained for the suggested query completions in the initial set 300. The search results are then used to calculate the similarity scores (SS). The similarity score for a given suggested query completion in the initial set 300 is based at least in part on the similarity between content in the user document 335, and content in the search result documents for the given suggested query completion. The similarity scores may for example be calculated using the techniques described above.

The similarity scores and the initial ranking scores are then used to calculate refined ranking scores (RRS). In this example, the refined ranking score for a given candidate query completion is calculated as its initial ranking score, divided by the sum of the product of the initial ranking score and the similarity score over all candidate query completions in the set. Alternatively, its refined ranking score may be calculated differently. For example, its refined ranking score may be calculated as a weighted average of initial ranking score and its similarity score. The refined ranking scores are then used to sort the candidate query completions to form a refined list 320.

In this example, the four highest ranking candidate query completions in the refined list 320 are selected as refined query completions for the partial query 302, thereby forming a final set 320 of query completions. The candidate query completions in the final set 320 represent queries relevant to the user's document 335, which the user may want to submit instead of the partial query 302 actually being typed.

The final set 320 of candidate query completions can then be provided for display to the user.

Figure 4:
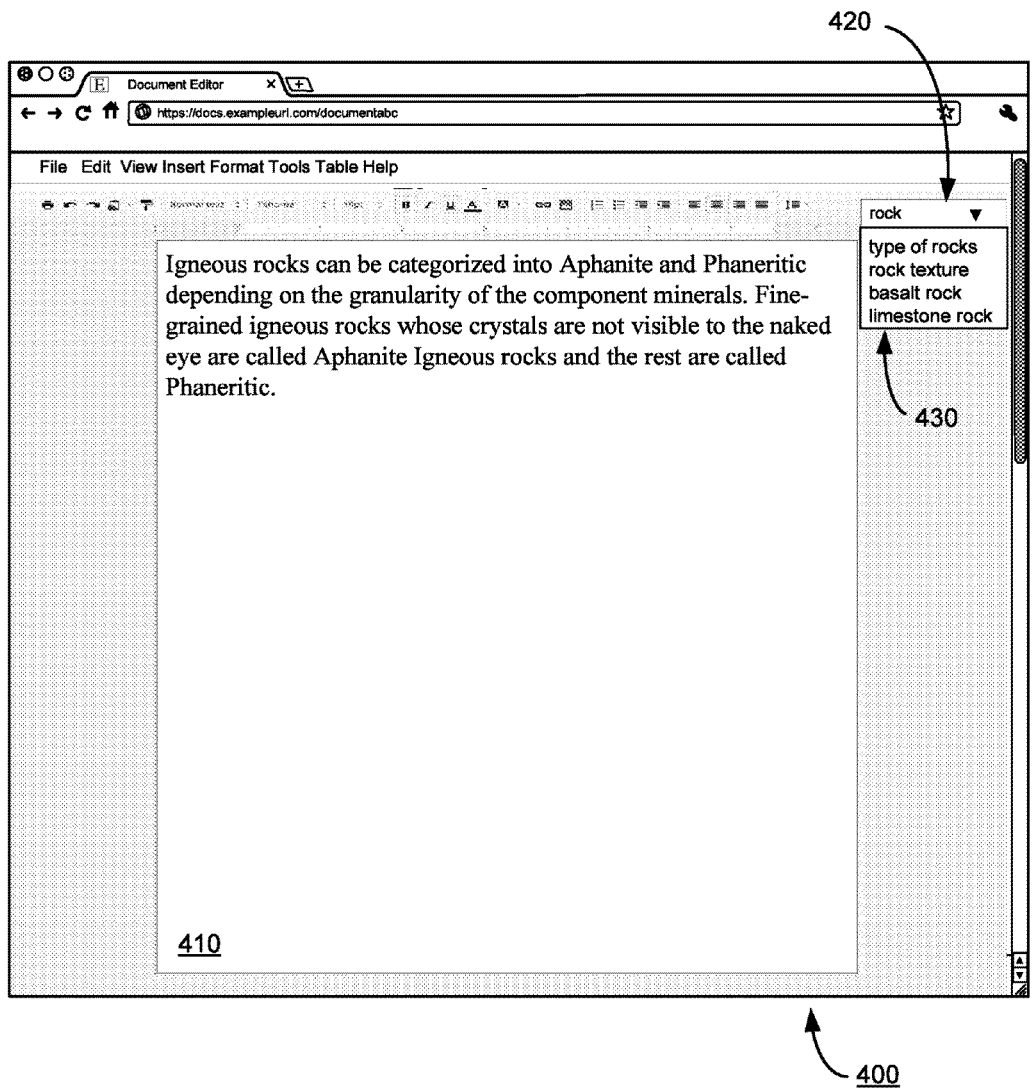
FIG. 4 is an example user interface that can be used to provide query completions that are relevant to a user's word processing document.

FIG. 4 is an example user interface 400 that can be used to provide query completions that are relevant to a user's word processing document 410. The user interface 400 includes a word processing document 410 that is displayed to a user within a browser executing on a computing device. In this example, the user's document 410 is about "rock formation".

The user interface 400 also includes a search field 420 that allows the user to enter a partial query to obtain refined query completions relevant to the document 410 using the techniques described herein. The search field 420 in this example is shown to the right of the document 410. Alternatively, the search field 420 can be located in other positions on the user interface 400. The position of the search field 420 may also be user configurable.

In this example, while the user is entering the partial query "rock" into the search field 420, a cascaded drop down menu 330 is presented. In this example, the cascaded drop down menu 330 includes the query completions "type of rocks", "rock texture", "basalt rock" and "limestone rock" that are relevant to the user's document 410.

Figure 5:
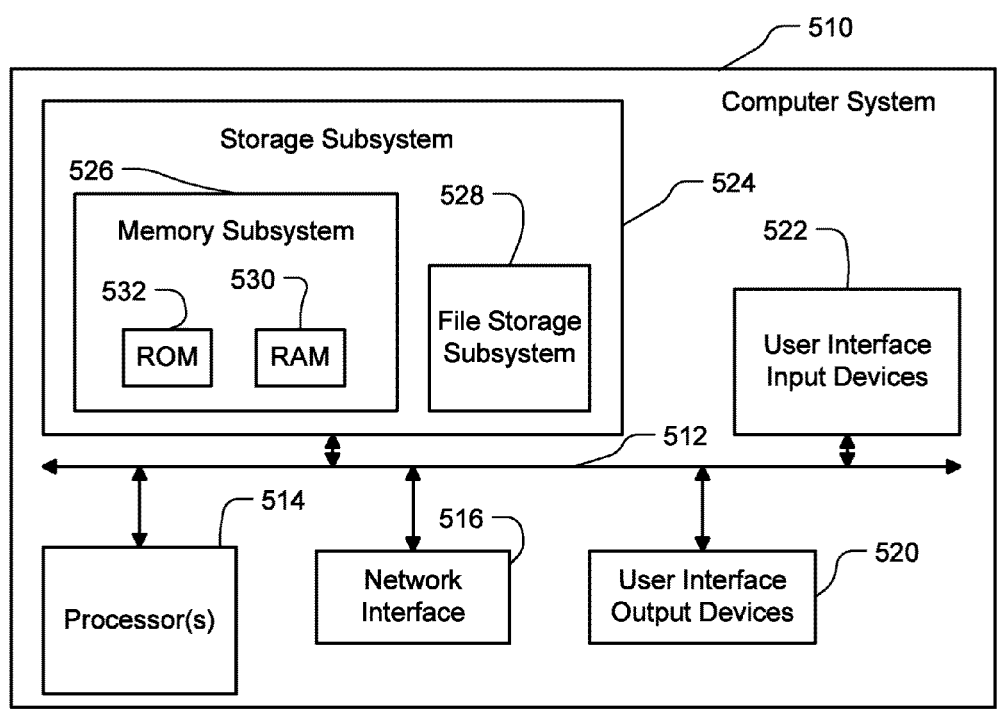
FIG. 5 is a block diagram of an example computer system.

FIG. 5 is a block diagram of an example computer system. Computer system 510 typically includes at least one processor 514 which communicates with a number of peripheral devices via bus subsystem 512. These peripheral devices may include a storage subsystem 524, comprising for example memory devices and a file storage subsystem, user interface input devices 522, user interface output devices 520, and a network interface subsystem 516. The input and output devices allow user interaction with computer system 510. Network interface subsystem 516 provides an interface to outside networks, including an interface to communication network 140, and is coupled via communication network 140 to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include possible types of devices and ways to input information into computer system 510 or onto communication network 140.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein, including the logic to provide refined query completions relevant to a user's document according to the processes described herein. These software modules are generally executed by processor 514 alone or in combination with other processors.

Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The modules implementing the functionality of certain embodiments may be stored by file storage subsystem in the storage subsystem 524, or in other machines accessible by the processor.

Bus subsystem 512 provides a mechanism for letting the various components and subsystems of computer system 510 communicate with each other as intended. Although bus subsystem 512 is shown schematically as a single bus, alternative embodiments of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating the preferred embodiments. Many other configurations of computer system 510 are possible having more or less components than the computer system depicted in FIG. 5.

While the present invention is disclosed by reference to the preferred embodiments and examples detailed above, it is understood that these examples are intended in an illustrative rather than in a limiting sense. Computer-assisted processing is implicated in the described embodiments. Accordingly, the present invention may be embodied in methods for providing refined query completions that are relevant to a user's currently displayed document, systems including logic and resources to provide refined query completions that are relevant to a user's currently displayed document, systems that take advantage of computer-assisted methods for providing refined query completions that are relevant to a user's currently displayed document, media impressed with logic to provide refined query completions that are relevant to a user's currently displayed document, data streams impressed with logic to provide refined query completions that are relevant to a user's currently displayed document, or computer-accessible services that carry out computer-assisted methods for providing refined query completions that are relevant to a user's currently displayed document. It is contemplated that modifications and combinations will readily occur to those skilled in the art, which modifications and combinations will be within the scope of the following claims.

We claim as follows:

1. A method comprising:
receiving a partial query entered into a search field on a computing device;
receiving data indicating a document presented on the computing device during entry of the partial query;
obtaining a set of candidate query completions for the partial query;
identifying one or more search result documents for each of one or more respective candidate query completions in the set;
calculating similarity scores for candidate query completions in the set, wherein calculating a similarity score for a given candidate query completion of the set of candidate query completions is based at least in part on a similarity between content in the presented document and content in the one or more search result documents identified for the given candidate query completion;
selecting one or more of the candidate query completions in the set as refined query completions for the partial query based at least in part on the similarity scores; and
providing the refined query completions for presentation by the computing device.

2. The method of claim 1, wherein:
identifying the search result documents includes obtaining search quality scores for the search result documents, and
selecting the one or more of the candidate query completions is further based on the search quality scores for the search result documents.

3. The method of claim 1, further comprising ranking the set of candidate query completions using the similarity scores, and wherein selecting one or more of the candidate query completions in the set as the refined query completions is based at least in part on the ranking.

4. The method of claim 3, wherein selecting one or more of the candidate query completions comprises selecting a predetermined number of highest ranked of the candidate query completions as the refined query completions.

5. The method of claim 1, wherein:
obtaining the set of candidate query completions includes obtaining initial ranking scores for the candidate query completions in the set; and
selecting one or more of the candidate query completions as the refined query completions is further based on the initial ranking scores.

6. The method of claim 1, wherein the presented document is presented within an application containing the search field.

7. The method of claim 1, wherein the received data includes a unique document identifier for the presented document.

8. The method of claim 1, wherein the presented document is a document stored locally on the computing device.

9. The method of claim 8, wherein the presented document has been edited by a user of the computing device.

10. A system including memory and one or more processors operable to execute instructions, stored in the memory, including instructions to perform the operations of:
receiving a partial query entered into a search field on a computing device;
receiving data indicating a document presented on the computing device during entry of the partial query;
obtaining a set of candidate query completions for the partial query;
identifying one or more search result documents for each of one or more respective candidate query completions in the set;
calculating similarity scores for candidate query completions in the set, wherein calculating a similarity score for a given candidate query completion of the set of candidate query completions is based at least in part on a similarity between content in the presented document and content in the one or more search result documents identified for the given candidate query completion;
selecting one or more of the candidate query completions in the set as refined query completions for the partial query based at least in part on the similarity scores; and
providing the refined query completions for presentation by the computing device.

11. The system of claim 10, wherein:
the instructions to identify the search result documents includes instructions to obtain search quality scores for search result documents in the respective lists, and
the instructions to select the one or more of the candidate query completions is further based on the search quality scores for the search result documents.

12. The system of claim 10, further comprising instructions to rank the set of candidate query completions using the similarity scores, and wherein selecting one or more of the candidate query completions in the set as the refined query completions is based at least in part on the ranking.

13. The system of claim 12, wherein the instructions to select one or more of the candidate query completions comprises instructions to select a predetermined number of highest ranked of the candidate query completions as the refined query completions.

14. The system of claim 10, wherein:
  the instructions to obtain the set of candidate query completions includes instructions to obtain initial ranking scores for the candidate query completions in the set; and
  the instructions to select one or more of the candidate query completions as the refined query completions is further based on the initial ranking scores.

15. The system of claim 10, wherein the presented document is presented within an application containing the search field.

16. The system of claim 10, wherein the received data includes a unique document identifier for the presented document.

17. The system of claim 10, wherein the presented document is a document stored locally on the computing device.

18. The system of claim 10, wherein the presented document has been edited by a user of the computing device.

19. A non-transitory computer readable storage medium storing computer instructions executable by a processor to perform a method comprising:
  receiving a partial query entered into a search field on a computing device;
  receiving data indicating a document presented on the computing device during entry of the partial query;
  obtaining a set of candidate query completions for the partial query;
  identifying one or more search result documents for each of one or more respective candidate query completions in the set;
  calculating similarity scores for candidate query completions in the set, wherein calculating a similarity score for a given candidate query completion of the set of candidate query completions is based at least in part on a similarity between content in the presented document and content in the one or more search result documents identified for the given candidate query completion;
  selecting one or more of the candidate query completions in the set as refined query completions for the partial query based at least in part on the similarity scores; and
  providing the refined query completions for presentation by the computing device.

20. The non-transitory computer readable storage medium of claim 15, wherein: identifying the search result documents includes obtaining search quality scores for the search result documents, and selecting the one or more of the candidate query completions is further based on the search quality scores for the search result documents.

* * * * *